(12) United States Patent
Chandra et al.

(10) Patent No.: US 8,184,656 B2
(45) Date of Patent: May 22, 2012

(54) CONTROL CHANNEL NEGOTIATED INTERMITTENT WIRELESS COMMUNICATION

(75) Inventors: Ranveer Chandra, Kirkland, WA (US); Christos Gkantsidis, Cambridge (GB); Ratul Mahajan, Seattle, WA (US); Antony Ian Taylor Rowstron, Cambridge (GB); Alastair Wolman, Seattle, WA (US); Yongqiang Xiong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 11/866,092

(22) Filed: Oct. 2, 2007

(65) Prior Publication Data
US 2009/0088089 A1 Apr. 2, 2009

(51) Int. Cl.
*H04L 12/413* (2006.01)
(52) U.S. Cl. ..... 370/445; 370/282; 455/455; 455/456.1; 455/432.1; 455/421; 455/101
(58) Field of Classification Search ................ None
See application file for complete search history.

(56) References Cited

U.S. PATENT DOCUMENTS

| | | | |
|---|---|---|---|
| 6,421,395 B1 * | 7/2002 | Wei | 375/265 |
| 6,771,609 B1 * | 8/2004 | Gudat et al. | |
| 7,046,640 B2 * | 5/2006 | Silva et al. | |
| 7,505,528 B2 * | 3/2009 | Morris | |
| 2004/0137901 A1 * | 7/2004 | Hamasaki et al. | 455/436 |
| 2005/0003839 A1 * | 1/2005 | Tripp | |
| 2005/0008130 A1 * | 1/2005 | Wakamatsu | |
| 2006/0034165 A1 * | 2/2006 | Levy | |
| 2006/0135067 A1 * | 6/2006 | Dunko | |
| 2006/0203789 A1 * | 9/2006 | Iacono et al. | |
| 2007/0092045 A1 * | 4/2007 | Woo et al. | |
| 2007/0132824 A1 * | 6/2007 | Iida et al. | |
| 2007/0173260 A1 * | 7/2007 | Love et al. | |
| 2008/0062871 A1 * | 3/2008 | Grayson | |
| 2008/0071988 A1 * | 3/2008 | Schloter et al. | 711/118 |
| 2008/0095110 A1 * | 4/2008 | Montojo et al. | 370/330 |
| 2008/0151817 A1 * | 6/2008 | Fitchett et al. | |
| 2009/0245145 A1 * | 10/2009 | Pennance | 370/277 |

* cited by examiner

*Primary Examiner* — Kibrom T Hailu
(74) *Attorney, Agent, or Firm* — Lee & Hayes, PLLC (57) ABSTRACT

A dual mode communication device utilizes a control channel to exploit diversity, history, and context in advance of establishing a broadband data exchange session on a broadband but shorter range wireless data channel, maximizing productive use of such a session. Appropriate diversity for the negotiated session further enhance data transfer, including path diversity, radio technology diversity (e.g., WiMax, Wi-Fi, ultra wideband, Bluetooth), antenna diversity (e.g., MIMO), modulation diversity (e.g., rate selection for 802.11, or symbol length selection to combat multi-path fading), and frequency diversity (e.g., 2.4 GHz versus 5 GHz). Historical information about channel characteristics optimize the selection of channel parameters with respect to the diversity choices. In addition, context information such as location and speed can be used to categorize the historical information that is collected to further optimize channel parameters.

20 Claims, 8 Drawing Sheets

CONTROL CHANNEL NEGOTIATED INTERMITTENT WIRELESS COMMUNICATION

BACKGROUND

A wireless local access network (WLAN) is a data transmission system to provide location independent network access between computing devices by using radio waves rather than a cable infrastructure. Often, WLANs are implemented as the final link between existing wired network and a group of client computers, giving these users wireless access to the full resources and services of the corporate network across a building or campus setting.

The rate at which wireless networks are being deployed is accelerating along with their size and ubiquity. Wireless networks using access points based on IEEE standard 802.11, commonly referred erroneously to as WiFi, and base stations based on IEEE standard 802.16 WiMax technology standards comprise a majority of current wireless deployments. There are also personal access networks deployed under the Bluetooth standard as well as other peer-to-peer network arrangements. Mobile connectivity under these standards is largely a matter of moving about within an area of coverage (i.e., a hot spot) in order to communicate with these network access devices.

The 802.11 specification as a standard for WLANs was ratified by the Institute of Electrical and Electronic Engineers (IEEE) in 1997. Like all of the IEEE 802 standards, 802.11 standards focus on the bottom two level of the International Organization for Standardization (ISO) model, the physical layer and the data link layer. The data link layer provides functional and procedural means to transfer data between network entities and to detect and possibly correct errors that may occur in the physical layer. In the current context, this data link layer is further subdivided into Media Access Control (MAC) sublayer that manages interaction of devices with a shared medium. Above the MAC sublayer is the media-independent IEEE 802.2 Logical Link Control (LLC) sublayer that deals with addressing and multiplexing on multi-access media.

While such wireless capabilities offer a degree of mobility over wired infrastructure, coverage areas are still quite limited and disruptions in communication are frequent. Often, wireless communication is made on frequencies that are limited to essentially line of sight, subject to shadowing in coverage area due to topology and obstructions. Typically, selecting an access network is solely based upon received signal strength, which can roll off unexpectedly due to such unknown shadowing effects when moving to a new location and due to an unappreciated direction of travel away from the network device.

The 802.11 standards were implemented to provide reliable and secure wireless connectivity at high data rates. 802.11b and 802.11g standards use the 2.4 GHz band, operating in the United States under Part 15 of the FCC Rules and Regulations in the unlicensed Industrial, Scientific and Medical (ISM) bands. With the abundance of WLAN devices (e.g., access points, personal digital assistants (PDSs), laptop computers) in geographic proximity, interference is an increasing problem.

In addition, because of this choice of frequency band, 802.11b and 802.11g equipment could occasionally suffer interference from microwave ovens, sulfur lamps, wireless microphones, television broadcasts, or cordless telephones. Wireless personal area networks (PANs), such as Bluetooth devices, while operating in the same 2.4 GHz band, do not interfere with 802.11b and 802.11g in theory because they use a frequency hopping spread spectrum signaling method (FHSS) while 802.11b/g uses a direct sequence spread spectrum signaling method (DSSS). However, it should be appreciated that FHSS means that such devices should only occasionally collide on the same frequencies rather than not interfering at all. Physical and MAC layer adaptation is critical for performance wireless networks to mitigate the effect of interference. Previously, it has been difficult for the radio to detect what the exactly source of channel degradation and therefore may not take the right adaptation actions.

Even if a network access device is selected somehow that is most appropriate for a current location and route of travel, and even if correct adaptations are made to increase the effective coverage area, travelling at any rate at all tends to shrink the effective duration of the coverage to a vanishingly small amount of time. Many of these network access devices operate in an unlicensed frequency band and are thus regulated in the amount of power that can be broadcast. Consider the length of time that a person is within a hotspot, walking down the sidewalk. Further consider even how the larger coverage area of some municipal WiMax footprint shrink when transiting by car or rail through the coverage area.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In one aspect, a portable wireless device for performing a short duration digital data exchange with another wireless device includes both a first wireless communication channel for performing a data exchange session as well as a second wireless communication channel of longer range than the first wireless communication channel for control of the data exchange session. A wireless controller responds to sensing a control signal on the second wireless communication channel to negotiate parameters for a future data exchange session including a data request. The wireless controller further responds to being within range of the other wireless device by establishing the first wireless communication channel performing the data exchange of the data request.

In another aspect, a methodology for short duration digital data exchange with another wireless device includes negotiating parameters via a wireless control channel for a future wideband data exchange session on a wireless data channel. Request is made for data to be exchanged during the data exchange session. Once within reception range suitable for wideband data exchange over the wireless data channel, then the data exchange session is established and performed, optimizing thereby the time available for the transfer without the loss of time otherwise required to establish session parameters and prepare the data.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description

DETAILED DESCRIPTION

A dual mode communication device utilizes a control channel to exploit diversity, history, and context in advance of establishing a wideband data exchange session on a wideband but shorter range wireless data channel, maximizing productive use of such a session. Appropriately selected diversity for the negotiated session further enhance data transfer, including path diversity, radio technology diversity (e.g., WiMax, Wi-Fi, ultra wideband, Bluetooth), antenna diversity (e.g., MIMO), modulation diversity (e.g., rate selection for 802.11, or symbol length selection to combat multi-path fading), and frequency diversity (e.g., 2.4 GHz versus 5 GHz). Historical information about channel characteristics optimize the selection of channel parameters with respect to the diversity choices. In addition, context information such as location and speed can be used to categorize the historical information that is collected to further optimize channel parameters.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
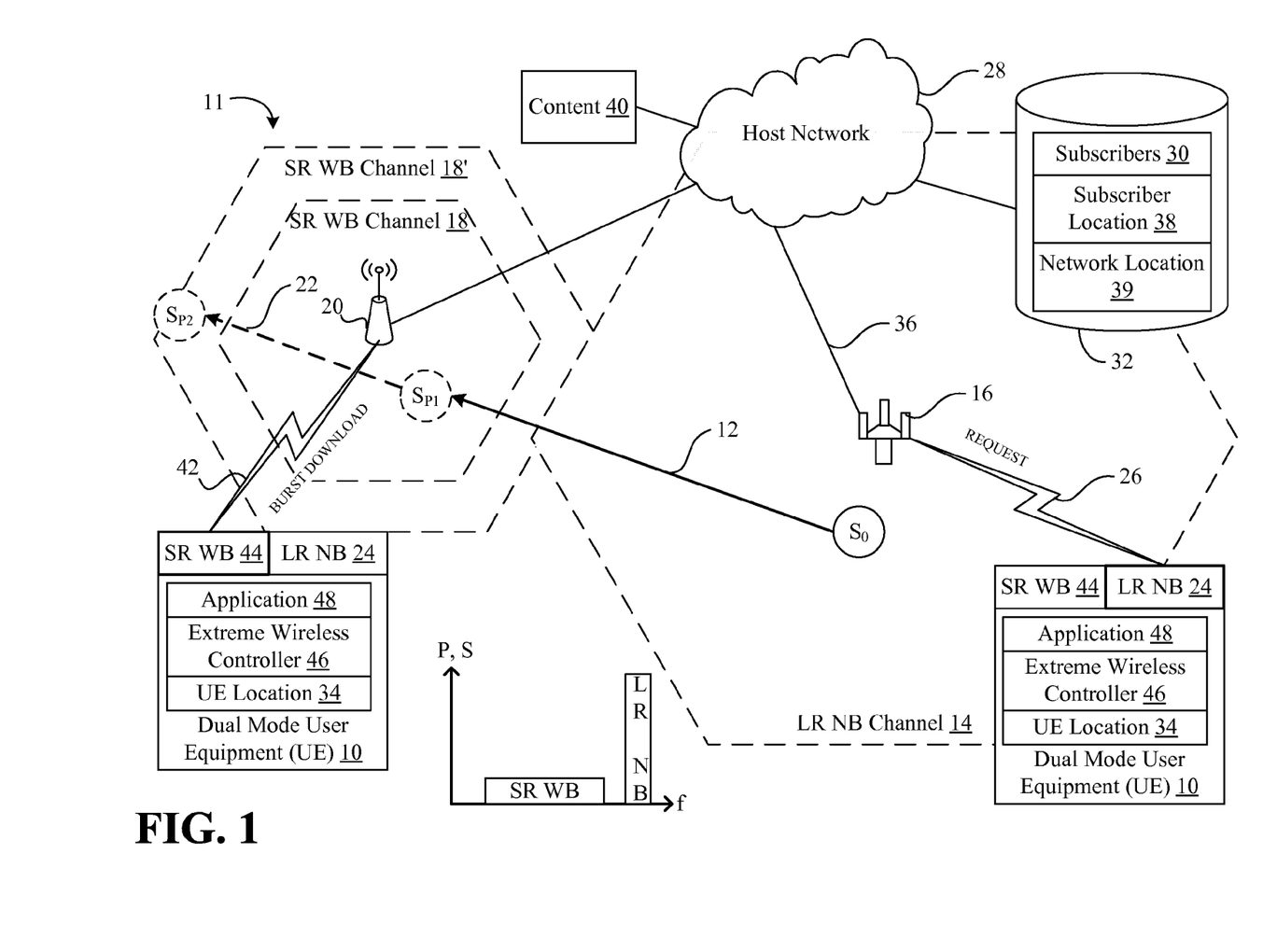
FIG. 1 is diagram of a dual mode user equipment first in communication with a long range, narrowband wireless network device and then traveling to a short range, wideband wireless network device to receive a burst data exchange negotiated by an extreme wireless controller.

Referring initially to FIG. 1, a wireless device, depicted as a dual mode user equipment (UE) 10, as part of a communication system 11 is moving along a route of travel, depicted by arrow 12 from a current position "$S_0$" that is within a large coverage area 14 of long range (LR), narrowband (NB) wireless network device 16. At some later time, the UE 10 reaches a position "SP1" that is within a smaller coverage area 18 of a short range (SR), wideband (WB) wireless network device 20. At yet a later time, the UE 10 continues along an extended route of travel, depicted by arrow 22, to a further position "SP2" that is outside of the smaller coverage area 18. Thus, the UE 10 has a predicted constrained period of time in which a wideband data exchange may be performed with the SR WB wireless network device 20.

The UE 10 has two communication modules. First, a LR NB module 24 is depicted as making a wireless request at 26 to the LR NB wireless device 16 that is transferred to a host network 28 that confirms the identity of the subscriber in a subscribers database 30 of a storage volume 32. Although location information may be approximately inferred based on a historical learning of the coverage areas of various network devices, the UE 10 advantageously incorporates a UE location tracking data structure 34.

It should be appreciated that for clarity the two network devices 16, 20 are depicted as distinctly uncentered, and in fact non-overlapping, from one another in coverage area, although in some if not most applications it may be desirable to co-locate such communication channels into a dual mode network device (not shown). An arrangement as depicted wherein a data packet network 36 (e.g., Internet) connects the network devices 16, 20 to the host network 28 can have benefits by having the host network 28 assist in the prediction and selection of path diversity. To that end, the host network 28 tracks the subscriber location and vector (e.g., direction and speed) in a subscriber location database 38. In order to estimate the location of a subscriber who does not have location sensing capability, or to suggest a network located along a route of travel, the host network 28 further tracks the location of network devices in a network location database 39, which can include mobile network nodes whose location changes within a mesh network rather than an infrastructure node.

The request 26 to the host network 28 can pertain to media content 40 that can be readily accessed by the host network 28. However, the rate of transfer, even for the SR WB network device 20 can be enhanced by pre-fetching this content 40 so that the network device 20 is ready for a "burst" download, as depicted at 42, to the other communication module of the UE 10, the SR WB module 44, of this content 40 without the necessity for delays in making the request and waiting for perhaps a sequence of servers to relay the data. An extreme wireless controller 46 of the UE 10 makes the request 26 in accordance with prioritization of content 40 consumed by an application 48, also performed by the UE 10.

In addition, the UE 10 may learn from the host network 28, or access historical data from past sessions with the SR WB network device 20, in order to optimize diversity to increase the effective range of the network device 20, depicted at 18'. Examples of such diversity include configuration parameters associated with the physical (PHY) layer such as modulation adaptation or transmit power control adaptation. Another example of diversity includes configuration parameters associated with the medium access control (MAC) layer for example, for access point (AP) selection adaptation, fragmentation size adaptation, data rate adaptation, request to send/clear to send (RTS/CTS) threshold adaptation, collision avoidance adaptation, power management adaptation, dynamic channel allocation or spectral reuse. Communication configuration parameters associated with the network and/or transport protocol layers can include parameters for end-to-end protocol adaptation or congestion control adaptation. In addition, communication configuration parameters can be associated with the application layer to influence an application for mobility awareness, such as picking a network device 20 optimized by location.

As previously mentioned, the diversity selection can further select among a radio technology diversity (e.g., WiMax, Wi-Fi, ultra wideband, Bluetooth), antenna diversity (e.g., multiple input multiple output (MIMO)), modulation diversity (e.g., rate selection for 802.11, or symbol length selection to combat multi-path fading), and frequency diversity (e.g., 2.4 GHz versus 5 GHz). Historical information about channel characteristics optimize the selection of channel parameters with respect to the diversity choices. In addition, context information such as location and speed can be used to categorize the historical information that is collected to further optimize channel parameters. In addition, medium access control (MAC) features can be included that, in the presence of multiple devices 20, coordinate their access to the network to avoid undue performance degradation.

Figure 2:
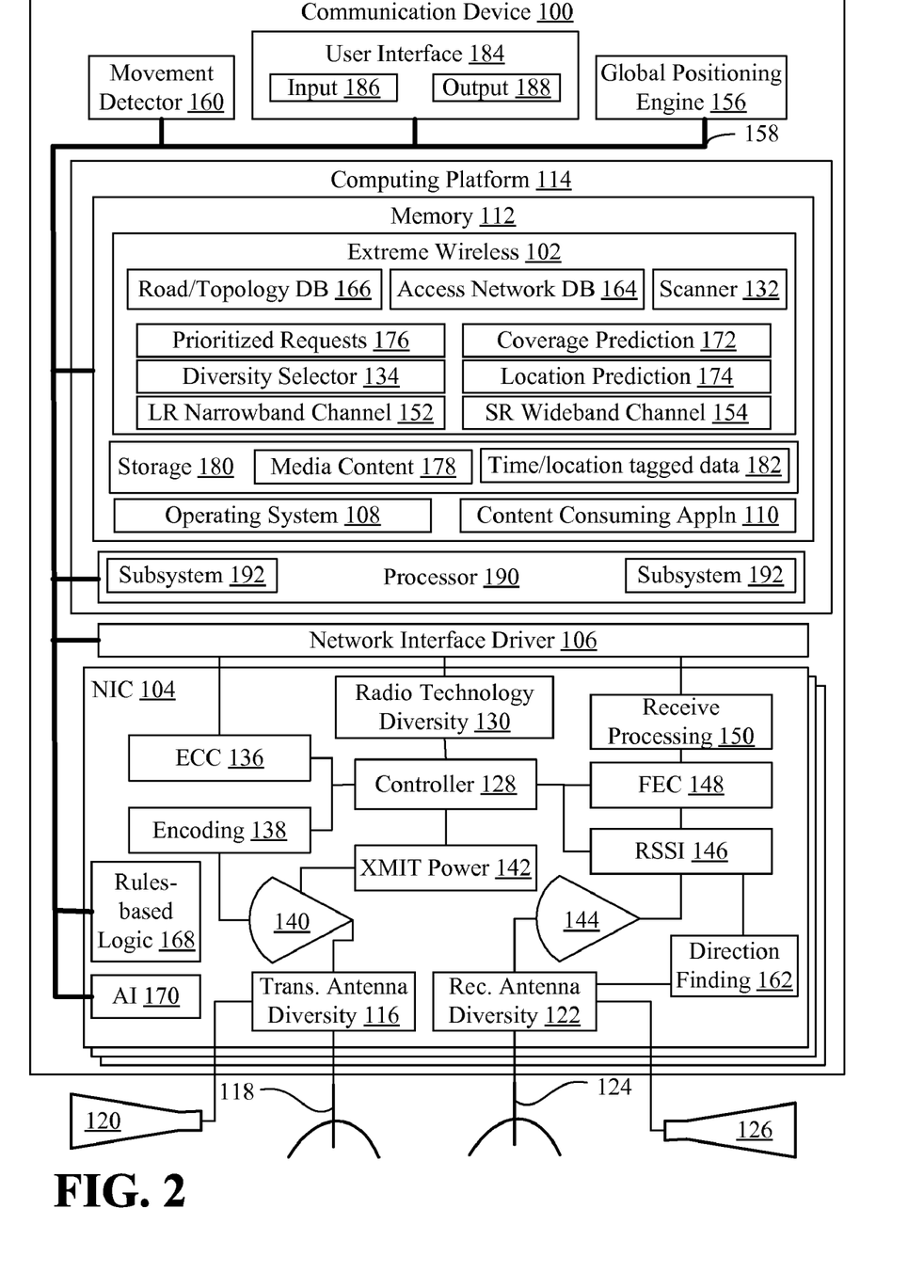
FIG. 2 is a block diagram of an exemplary dual mode user equipment including an extreme wireless control computing platform.

Referring now to FIG. 2, there is illustrated a schematic block diagram of a communication device 100 according to one aspect of the subject invention, in which an extreme wireless component 102 increases the useful portion of a data exchange session on a wireless data channel by previously coordinating the session on a longer range wireless control channel. The dual mode user equipment 10 of FIG. 1, as well as any other computing devices capable of establishing two wireless communication channels and performing diversity selection actions according to aspects of the invention may include components as illustrated in FIG. 2. Thus, the communication device 100 (e.g., UE 10) can include one or more network interface cards (NIC) 104 which allows the communication device 100 to communicate over a network such as, for example, the wireless networks 16, 20 (FIG. 1). A network interface driver 106 enables interaction between NIC 104 and other components of the communication device 100, such as, for example, an operating system 108 and a content consuming application 110, both resident in a memory 112 of a computing platform 114 of the communication device 100 along with the extreme wireless component 102. Driver 106 may be computer-executable instructions encoded in a suitable computer-readable medium, which may include memory components on NIC 104 or may include memory storing operating system instructions for device 100 or other suitable memory depicted at 112.

NIC 104 can provide functionality of a receiver and transmitter configured to receive and transmit wireless communications. In particular, the NIC 104 can contain a transmitter antenna diversity selector 116 having antennas selected to work together or individually for an advantageous antenna gain in a particular frequency band, depicted as an omni-directional transmit antenna 118 and a directional microwave horn transmit antenna 120. The NIC 104 can contain a receiver antenna diversity selector 122 having antennas selected to work together or individually for an advantageous antenna gain in a particular frequency band, depicted as an omni directional receive antenna 124 and a directional microwave horn receive antenna 126. Arrays of antennas may be sequenced for use intermittently for transmit and receive as well. In order to increase the diversity of frequency and/or radio technology options, antenna arrangements may be dedicated to a particular modality and optimized for this use (not shown). Components included in the receiver and transmitter are controlled by a transceiver controller 128.

A radio technology diversity component 130 interposed between the driver 106 and the transceiver controller 128 can include additional configuration resources selectable to utilize transmit and/or receive functions external to the NIC 104, such as accessing an external receiver. For example, a data communication port (not shown) can provide access with a remote computer, server, service, or the like, such as processors integrated into a vehicle that have access to GPS data, temperature/precipitation data, a dashboard mounted user interface, etc. The port can include at least one of Universal Serial Bus (USB) and/or IEEE 1394 serial communications capabilities. Other technologies that can also be employed are, but are not limited to, for example, infrared communication utilizing an infrared data port, Bluetooth™, Wi-Fi, Wi-Max, etc.

Controller 128 can receive commands from driver 106. In some versions, commands for controller 128 may be generated within components of operating system 108, application 110, or applications within the extreme wireless component 102, depicted as a scanner 132 and a diversity selector 134, and passed through driver 106 to controller 128. Similarly, status information concerning the operation of NIC 104 can be collected within controller 128 and passed to driver 106 or passed through driver 106 to operating system 108 or applications 110, 132, 134. Accordingly, control functions for any of the components within NIC 104 can be implemented within controller 128 or may be implemented within driver 106, within components of operating system 108, or within applications 110, 132, 134. Accordingly, the aspects of the invention relating to control of components of NIC 104 may be implemented by configuration of controller 128, programming within driver 106 or software components within operating system 108 or applications 110, 132, 134. However, the specific mechanism by which control functions are implemented can be made by any suitable implementation.

To send packets from the communication device 100, the packets can be encoded using an Error Control Coding (ECC) component 136 providing error control coding of any suitable type. For example, the encoding may use a multi-bit error correcting code. In the version illustrated, ECC component 136 can add a number of error control bits to each packet to be transmitted. The number of error control bits added to a packet may be configurable in response to commands from controller 128. Altering the number of bits per packet used for error control coding is a possible adaptation that may be made in NIC 104 for poor channel conditions. For example, more error control bits can be added in a noisy channel in which frequent errors occur. However, increasing the number of bits used for error correction reduces the percentage of bits used for data transmission.

An encoding component 138 may implement any suitable encoding according to a data transmission protocol used for wireless communication. Encoding implemented within encoding component 138 may use a modulation scheme that is configurable based on input from controller 128. The modulation scheme used in encoding component 138 may also be used to adapt to channel conditions. For example, encoding component 138 may support a range of encoding schemes with a variable number of bits per symbol. To adapt to noisy channels, encoding component 138 may be controlled to use an encoding scheme with a high number of bits per symbol. Conversely, in a high-quality channel, encoding component 112 may be controlled to use an encoding scheme with a low number of bits per symbol, thereby increasing the data transmission rate.

The encoded data are then transmitted by a transmitter 140 at a transmit power level controlled by a transmit "Xmit" power controller 142. Transmission may be made via one or more transmit antennae 118, 120. The transmit power level may also be controlled by controller 128 and may serve as a further mechanism to adapt to channel conditions. For example, in a noisy channel, a higher transmit power may be specified.

Corresponding processing may be performed on received packets. Packets received by the communication device 100 at one or more receive antennae 124, 126 may be processed through a receiver 144 and then supplied to a received signal strength indicator (RSSI) component 146. RSSI may be obtained from a field in a received packet or it may be directly measured from the received wireless signal and then output in any suitable format. RSSI component 146 may output a signal strength or a signal to noise ratio (SNR) for any desired packets. In the version illustrated, RSSI component 146 outputs a signal strength indication based on the received signal strength. However, the signal strength indication may be obtained in any suitable way. For example, it can be a field in a packet (e.g., an ACK packet) that contains an SNR value from a corresponding packet measured at the receiver side (e.g., a DATA packet).

The NIC 104 may include one or more components that decodes a received signal to produce a set of digital values for processing. The received bits may be modified in a forward-error correction (FEC) component 148 implementing forward-error decoding. In the version illustrated, FEC component 148 performs an operation that is the inverse of that performed by ECC component 136. FEC component 148 analyzes the received bits, including the error correction bits, and determines the number of bits in error in each received packet. Using an error correction algorithm, FEC component 148 determines the correct values for each bit that is incorrect and removes the error correction bits. In the version illustrated, FEC component 148 is coupled to controller 128. Accordingly, controller 128 has access to information concerning the number of errors detected in each received packet. It should also be appreciated that other types of error correction coding and decoding may be utilized by the communication device 100.

The FEC component 148 is coupled to a received data processing component 150 which further processes the received packets. Received processing component 150 may perform any number of received processing operations. For example, received processing component 150 may include a buffer in which a received packet is stored until it is transferred for further processing within operating system 108.

In the version illustrated, network interface card 104 may be implemented using technology as is known for constructing wireless network interface cards, including implementation of known antennae technology. Likewise, the error correcting coding implemented by ECC component 136 and FEC component 152 may be performed according to a known error correction algorithm. Likewise, the encoding performed in encoding component 138 may be performed in accordance with an 802.11 standard or in any other suitable way. The transmit power may be controlled by transmit power component 142 also using conventional components. Also, the received signal strength may be measured in RSSI component 146 in a conventional way, and receive processing component 128 may be implemented using conventional components. Controller 128 may also be implemented using conventional technology. For example, all of the components within NIC 104 may be implemented in a single integrated circuit chip or in multiple integrated circuit chips using technology currently known for constructing network interface cards.

It should be appreciated with the benefit of the present disclosure that the controller 128 performs cognitive radio functions in a noninterferring manner with a long range narrowband (control) channel application 152 and a short range wideband (data) channel application 154. The scanner component 132 detects and characterizes (e.g., pattern matching, bandwidth, power of frequency spectra, duration) in order to detect network devices and interference emitters. This information can be advantageously tagged with time and location data for historical reference and/or persistent interference adaptation. Location data can be obtained from a current location and direction of travel from a global positioning engine 156 accessed on a databus 158 of the computing platform 114. Short term extrapolation of position may be calculated from a movement detector 160 when the global positioning engine 156 is unable to synchronize to global position system (GPS) satellites. A direction finding component 162 can assist in determining bearing and estimating distance to such a source of a signal. Adaptation can further be performed in establishing a data exchange session, either with configuration parameters suggested by a remote source or through trial and error or stored preferences for a particular radio modality, with an optimum configuration stored for future use to reduce session setup and optimization time.

This adaptation is furthered by the diversity selector 134 advantageously receiving the results of the wideband scanner 132 in a radio channel buffer (not shown) for analysis. For example, an interference mitigation application can detect an interference signal of interest in the buffer and characterizes the signal. A pattern matching is performed with reference to stored network device or interference patterns. Recognized interference sources are then stored for persistent adaptation. Location information may be tagged to this entry, such as provided by a Global Positioning System (GPS) module 162. It should be further appreciated that prediction or confirmation of a particular interference emitter may be with reference to absolute location information for the communication device 100, calculated by bearing and estimated range from the local position, etc., obtained from a direction finding component. The diversity selector 134 can further optimize for control channel detection of a network device 16 (FIG. 1) from which services are sought, with such data stored in an access network database 164 for future reference.

The extreme wireless component 102 includes a database 166 of road and/or topological data that assists in predicting a route of travel. This prediction may be made by user input of a final destination, current location and direction/rate of travel as obtained from the global positioning engine 156 and/or movement detector 160, and/or a historical context derived from a rule-based logic component 168 or artificial intelligence component 170 that reside on the databus 158. For example, a common commuting route can be learned such that the communication device selects path diversity in anticipation of a particular sequence of road use.

Artificial intelligence (AI) component 170 can facilitate automating performance of one or more features described herein such as predicting location and selecting adaptations by employing various AI-based schemes for carrying out various aspects thereof. For example, a process for determining or inferring a target location or for determining a location-based service (or data) can be facilitated via an automatic classifier system and process.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Nayve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria, a present and/or target location, location-based data and/or services, when/if to communicate data location-based services, preferences for types of data to exchange, etc.

The rules-based logic component 168 can also be employed to automate certain functions described or suggested herein. In accordance with this alternate aspect, an implementation scheme (e.g., rule) can be applied to define thresholds, initiate location detection, facilitate communication of location-based services, preferences for types of data to exchange, etc. By way of example, it will be appreciated that the rule-based implementation can automatically define criteria thresholds whereby an analyzer component or processor 190 can employ the thresholds to determine a location-based service and/or set of data for adaptation (e.g., diversity configuration). In response thereto, the rule-based implementation can affect determination of location-based data and/or services by employing a predefined and/or programmed rule(s) based upon any desired criteria (e.g., distance). For example, a rule can be employed that determines a geographical area that surrounds a current location, such as determining a coverage area.

The topology data in combination with generic coverage footprints for classes of network devices and diversity settings may be calculated by a coverage prediction module 172 of the extreme wireless component 102. Thereby, a predicted session duration on a data channel and time of establishment may be determined in advance for negotiation over the control channel based upon a location prediction datastructure 174. Prioritized request database 176 may be accessed for prefetches and negotiation. For example, the content consuming application 110 can be a media player that accesses stored media content 178 in a storage medium 180. Negotiations can entail determining a preference list for media content (e.g., news updates on an web feed, email files, audio files from a particular podcast, etc.) As another example, the content consuming application 110 can be a navigation aid that provides auditory and/or visual driving cues based on the roadmap data. Time and location tagged data 182 (e.g., reduced driving speed due to congestion/road repair, weather data, etc.) can be stored for exchanging with an on-coming driving so that both drivers have the benefit of time-sensitive information as to upcoming road travel.

According to some aspects, the communication device 100 may comprise any type of computerized, communication device. For example, the communication device 100 may comprise a mobile communication device, such as a wireless and/or cellular telephone. Alternatively, the communication device 100 may comprises a fixed communication device, such as a Proxy Call/Session Control Function (P-CSCF) server, a network device, a server, a computer workstation, etc. It should be understood that communication device 100 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 100 can be a remote-slave or other similar device, such as remote sensors, remote servers, diagnostic tools, data relays, and the like, which does not have an end-user thereof, but which simply communicates data across a wireless or wired network. In alternate aspects, the communication device 100 may be a wired communication device, such as a landline telephone, personal computer, set-top box or the like. Additionally, it should be noted that any combination of any number of communication devices 100 of a single type or a plurality of the afore-mentioned types may be utilized in the cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 100 may include a user interface 184 for purposes such as requesting, interacting with, and/or playing the media content 178, or performing driving navigation. This user interface 184 includes an input device 186 operable to generate or receive a user input into the communication device 100, and an output device 188 operable to generate and/or present information for consumption by the user of the communication device 100. For example, input device 186 may include at least one device such as a keypad and/or keyboard, a mouse, a touch-screen display, a microphone in association with a voice recognition module, etc. In certain aspects, input device 186 may provide for user input of a request for content or for user input of a request for additional information. Further, for example, output device 188 may include a display, an audio speaker, a haptic feedback mechanism, etc. Output device 188 may generate a graphical user interface, a sound, a feeling such as a vibration, etc., and such outputs may be associated, for example, with the presentation of media content 178.

The computer platform 114 of the communication device is operable to execute applications to provide functionality to the device 100, and which may further interact with input device 186 and output device 188. The memory 112 of the computer platform 114 may include volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 112 may include active memory and storage memory, including an electronic file system and any secondary and/or tertiary storage device, such as magnetic media, optical media, tape, soft and/or hard disk, and removable memory components. In the illustrative version, memory 112 is depicted as RAM memory with storage device 180 representing nonvolatile local storage, which can be removeable, each connected to the data bus 158 of the computer platform 114. Certain of the capabilities of the communication device 100 can be facilitated by code loaded from local storage 180, retained in memory 112, and executed by the processor 190, such as the operating system (OS) 108.

Further, computer platform 114 may also include a processor 190, which may be an application-specific integrated circuit (ASIC), or other chipset, processor, logic circuit, or other data processing device. In some aspects, such as when communication device 100 comprises a cellular telephone, processor or other logic such as an application specific integration circuit (ASIC) (not shown) may execute an application programming interface (API) layers (not shown) that interfaces with any resident software components, such as voice call, data call, and media-related applications in memory 112. Device APIs may be a runtime environment executing on the respective communication device 100.

Additionally, processor 190 may include various processing subsystems 192 embodied in hardware, firmware, software, and combinations thereof, that enable the functionality of communication device 100 and the operability of the communication device 100 on a communications system (not shown). For example, processing subsystems 192 allow for initiating and maintaining communications, and exchanging data, with other networked devices as well as within and/or among components of communication device 100. In one aspect, such as in a cellular telephone, processor 190 may include one or a combination of processing subsystems 192, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth™ system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 192 of processor 190 may include any subsystem components that interact with applications executing on computer platform 114.

Computer platform 114 may further include a communications module with functionality in addition to, or as an alternative to, the NIC 104, that enables communications among the various components of communication device 100, as well as being operable to exchange media content 178 and content requests between the communication device 100 and network devices 16, 20 (FIG. 1). Such a communications module can be embodied in hardware, firmware, software and/or combinations thereof, and may further include all protocols for use in intra-device and inter-device communications.

It should be appreciated that the communication device 100 includes provisions for power supply. Power can be provided to the processor 190 and other components forming the communication device 100 by an onboard power system (e.g., a battery pack or fuel cell). In the event that the power system fails or becomes disconnected from the device 100, a supplemental power source can be employed to provide power to the processor 190 (and other components and to charge the onboard power system, if a chargeable technology. For example, the alternative power source can facilitate an interface to an external grid connection via a power converter. The processor 190 of the device 100 can induce a sleep mode to reduce the current draw upon detection of an anticipated power failure. For example, the wireless control component 102 can advantageously detect a situation in which no control channel is available, or a negotiated data session is still some time away, and turn of portions of the communication device 100 in order to conserve stored power and/or to reduce thermal loads.

Figure 3:
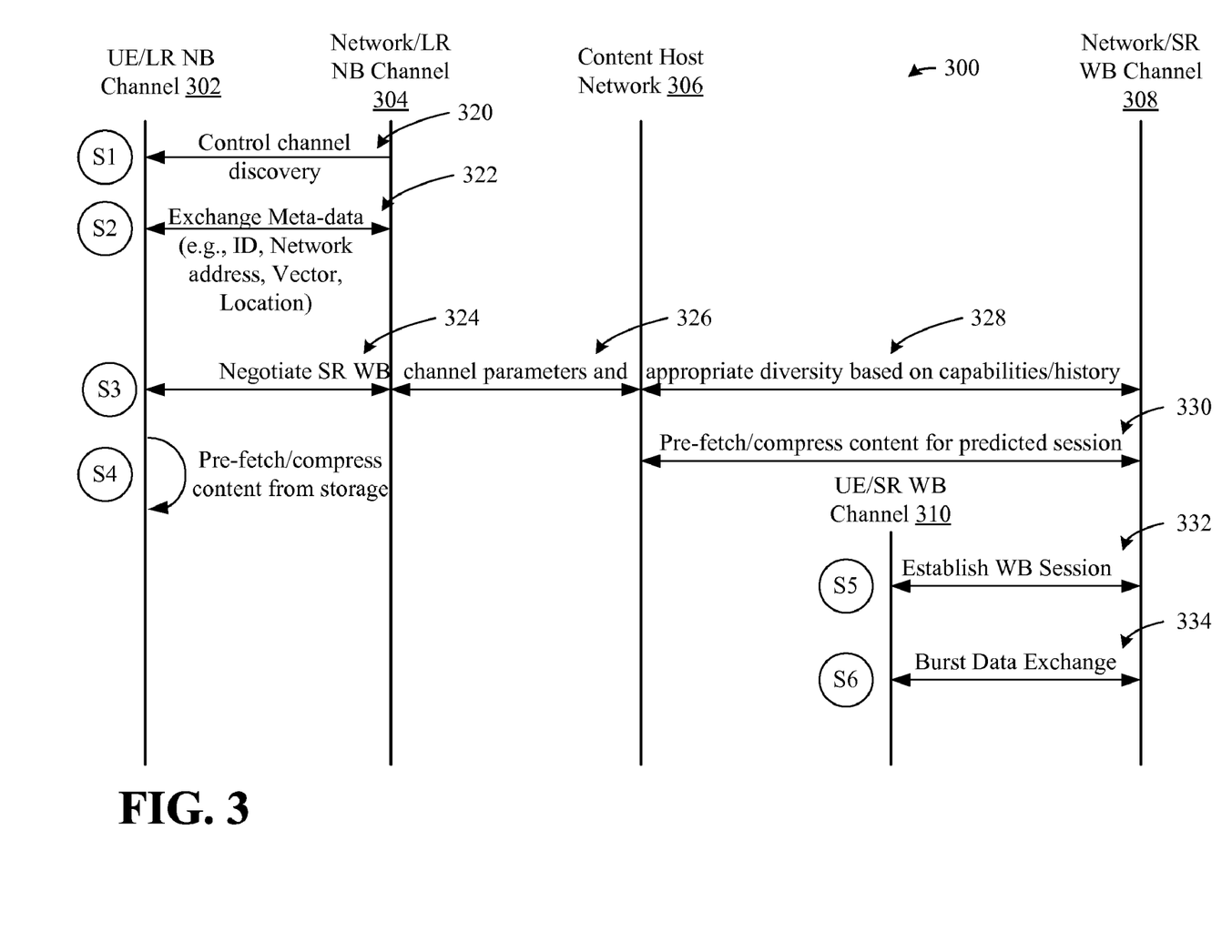
FIG. 3 is a timing diagram for the dual mode user equipment, network devices, and host network of FIG. 1 to establish a data exchange session.

In FIG. 3, a methodology 300 for optimizing a short duration wireless data channel by use of a longer range wireless control channel depicts messages between a long range (LR), narrowband (NB) control channel 302 of a user equipment (UE) with a LR NB control channel 304 of a network device that is in communication with a content host network 306, which in turn is in communication with a network short range (SR), wideband (WB) data channel 308. Eventually, a SR WB data channel 310 of the UE comes within wireless range of the network SR WB data channel 308. At stage "S1", the UE LR NB control channel 302 detects the network LR NB control channel 304, as depicted at 320. At stage "S2", exchanges are made of meta-data pertinent to the UE and/or the network (e.g., identification (ID), network address, current location, vector of speed and direction, final destination, etc.) as depicted at 322. At stage "S3", the UE LR NB control channel 302 negotiates via the network LR NB control channel 304 as depicted at 324, to the content host network 306, as depicted at 326, which in turn involves the network SR WD data channel 308 to the extent that the latter represents another network entity, as depicted at 328. These negotiations can determine approximate session begin and end times, data requests, communication parameters and diversity capabilities of the UE SR WB data channel 302 and the network LR WD data channel 308. In stage "S4", pre-fetches and compression for transmission are done in advance of the scheduled data exchange session to enhance the data transfer potential for the session. In particular, remote content accessible by the content host network 306 can be downloaded to local storage for the network SR WB data channel 308 to obviate data transfer limitations upstream of the expected data exchange session, as depicted at 330. At stage "S5", the UE SR WB data channel 310 comes within range of the network SR WB data channel 308 and the data session is established as depicted at 332, perhaps extended by adaptation measures coordinated in advance. In stage "S6", maximum benefit of the available data rate is made by a burst data exchange between the UE SR WB data channel 310 and the network SR WB data channel 308, as depicted at 334.

Figure 4:
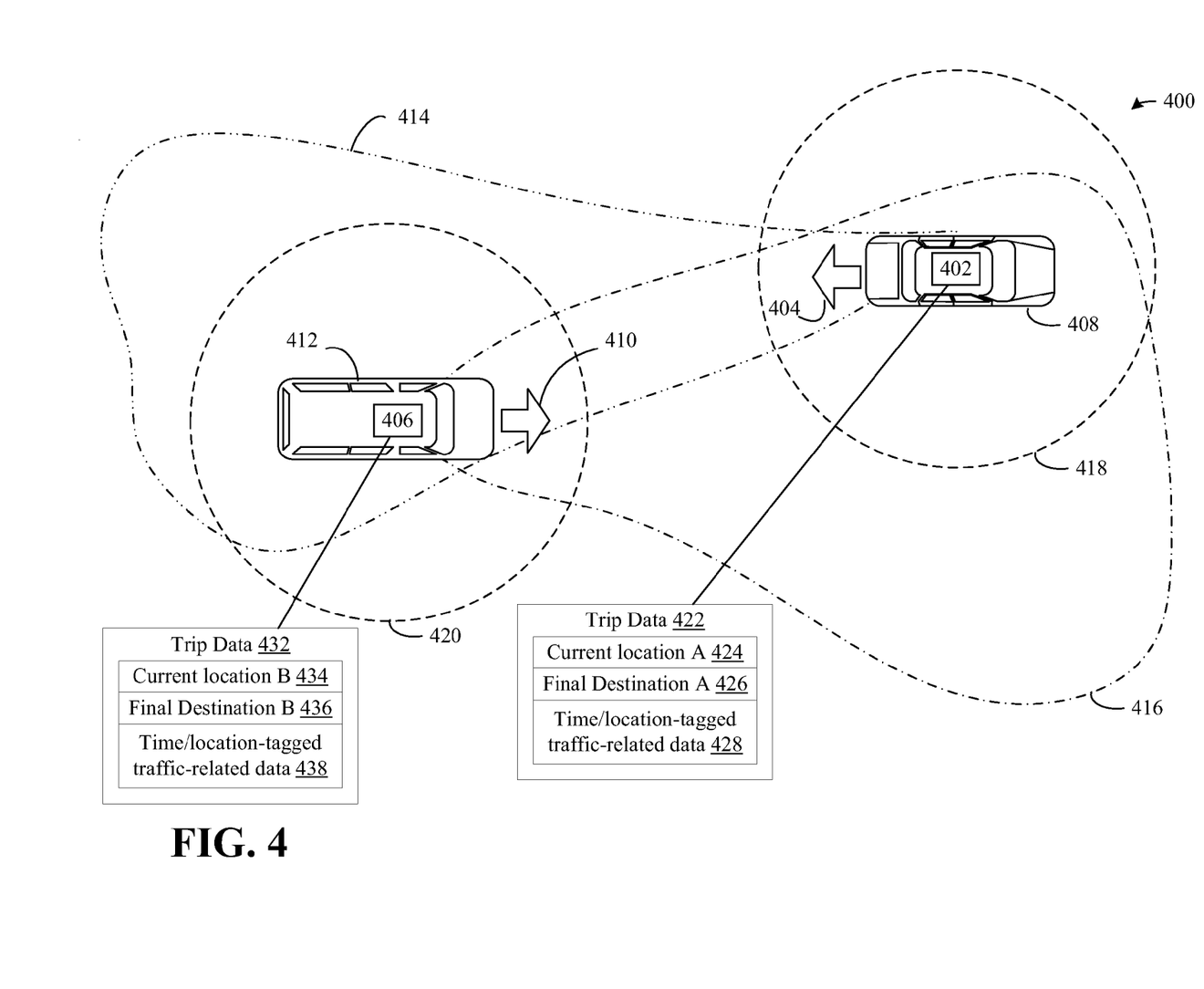
FIG. 4 is a diagram of short range and long range coverage areas superimposed upon two converging vehicles, each containing dual mode user equipment negotiating for an ad hoc data exchange session of traffic-related data.

In FIG. 4, optimization of a data channel via a control channel have applications to an ad hoc communication situation depicted at 400 in which one dual mode UE 402 is moving in a direction indicated at 404 past an another dual mode UE 406. It should be appreciated that this situation may arise in which one UE 406 is stationary, or one or both UEs 402, 406 have a relatively small closing rate due to being on foot or carried by respective vehicles in traffic lanes going in the same direction. In the depicted scenario, a vehicle 408 carrying the first UE 402 is going in an opposite direction as a direction indicated at 410 for a second vehicle 412 carrying the second UE 406. Thereby, a forward shaped control channel coverage beam 414 of the first UE 402 reaches the second vehicle 412 and a forward shaped control channel coverage beam 416 of the second UE 406 reaches the first vehicle 408 very shortly before the respective short range coverage beams 418, 420 of the UEs 402, 406 come within range as the vehicles 408, 412 pass each other. In the negotiated data session, data can be exchanged such as traffic and weather information that would be pertinent to the other vehicle 408, 412. This trip data 422 for the UE 402 in the first vehicle 408 is depicted as including a current location "A" data structure 424, a final destination "A" data structure 426, and filtered time/location-tagged traffic related data 428. Similarly, trip data 432 for the second UE 406 in the second vehicle 412 is depicted as including a current location "B" data structure 434, a final destination "B" data structure 436, and filtered time/location-tagged traffic related data 438.

Figure 5:
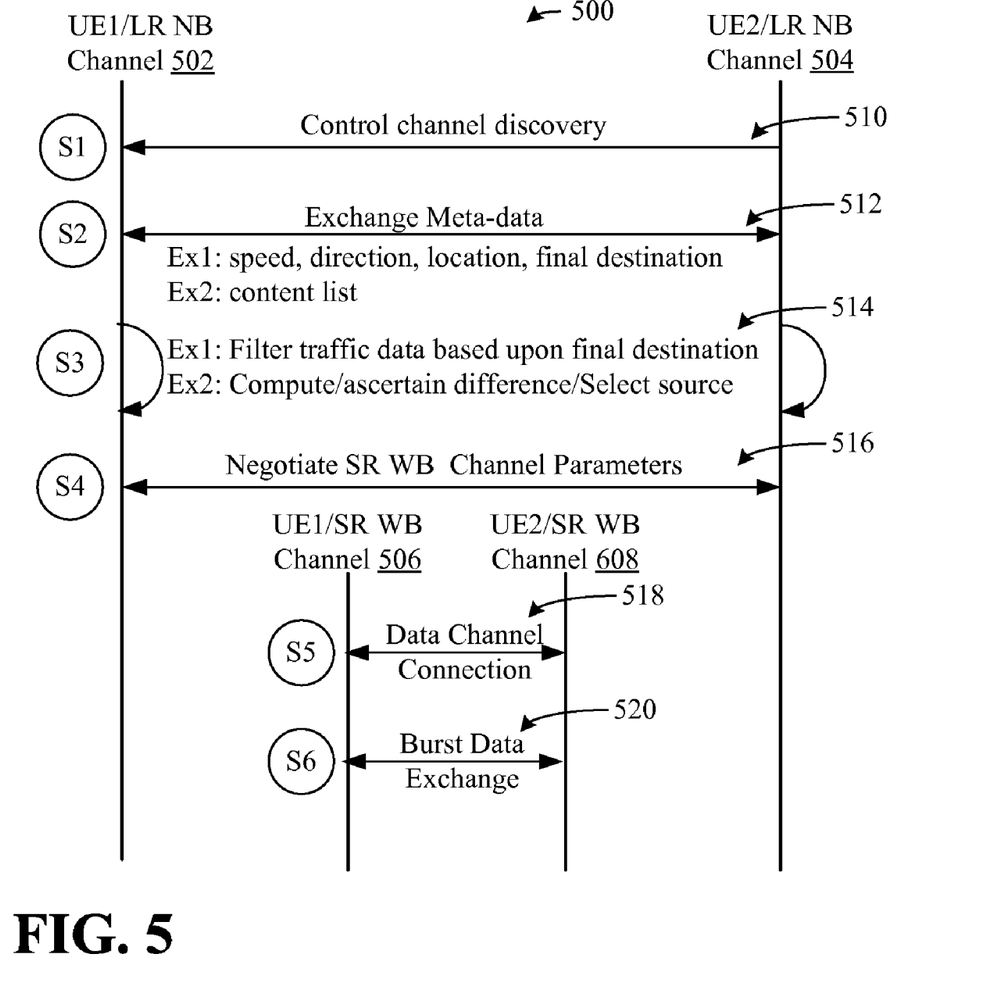
FIG. 5 is a timing diagram of an ad hoc data exchange session between two dual mode user equipment of FIG. 4.

In FIG. 5, a methodology 500 depicts communication exchanges such as in the scenario of FIG. 4 in which control channel communications are initially between a UE1 LR NB control channel 502 and a UE2 LR NB control channel 504 and then later between a UE1 SR WD data channel 506 and a UE2 SR WD data channel 508. At a stage "S1", the UE1 LRNB control channel 502 discovers the UE2 LRNB control channel 504, as depicted at 510. In stage "S2", meta-data is exchanged between the UE1 LR NB control channel 502 and the UE2 LR NB control channel 504 as depicted at 512. In the first example, this meta-data can pertain to speed, direction, location and final destination necessary to establish parameters of the data session as well as to facilitate filtering of traffic data usable by the other party. In a second example, this meta-data could pertain to media content lists of each party in order to determine what is to be requested from the other during the data session. In stage "S3", one or both parties analyzes the meta-data to see what desired services can be provided by the other, as depicted at 514. In the first example, this analysis may pertain to filtering the traffic data appropriate for the final destination of the other party. In the second example, this analysis may pertain to computing or ascertaining the different in media content or selecting and prioritizing sources for desired content. In stage "S4", the parameters of the SR WB data channel session are negotiated, as depicted at 516. In stage "S5", the UE1 SR WB data channel 506 comes within range and establishes a data channel connection with the UE2 SR WB data channel 508 as depicted at 518. In stage "S6", a "burst" data exchange occurs as depicted at 520 between the UE1 SR WB data channel 506 and the UE2 SR WB data channel 508.

Figure 6:
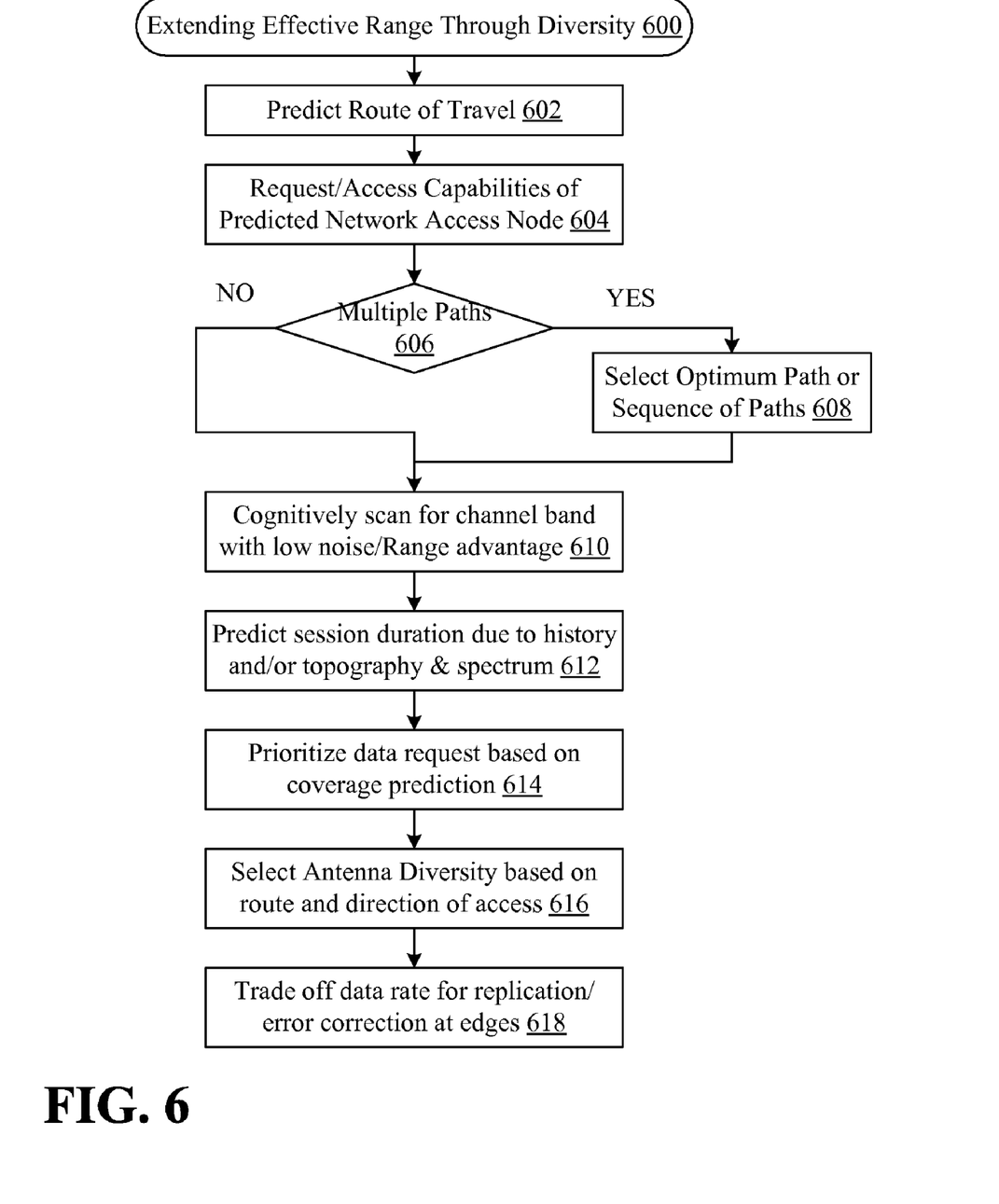
FIG. 6 is a flow diagram of a methodology for selecting diversity to enhance the coverage area for a planned short duration data exchange session.

In FIG. 6, a methodology 600 for optimizing an effective communication range for either or both of a control channel and a data channel begins with predicting a route of travel in block 602. Remotely provided data over the control channel or locally accessible historical data is retrieved in order to predict a network access node for wireless wideband data session in block 604. If multiple path diversity is determined as available in block 606, then an optimum diversity path is selected based on criteria such as available data rate, estimation of time within range of each path, currently sensed loading based on control channel monitoring or other means, etc., as depicted at block 608. Once a path is planned, then cognitively scan for one or more channel bands that can be requested for the impending data session in block 610. Further, predict session parameters for optimum diversity by taking into account the coverage range of the network SR WB access point or other network device in block 612. Available historical data can empirically provide such indications as well as topographical and remotely provided data can assist in making this determination. In block 614, a prioritization of data requests are made with awareness given to the expected duration of the upcoming data session. Based upon the negotiated session parameters, antenna diversity is selected based upon route of travel and direction of network access in order to maximize reception in block 616. Then in block 618, modulation and coding diversity are optimized for the data session, such as increasing the error and noise tolerance for those portions of the data session expected to be at the edge of reception or within proximity to cognitively sensed interference emitters.

Figure 7:
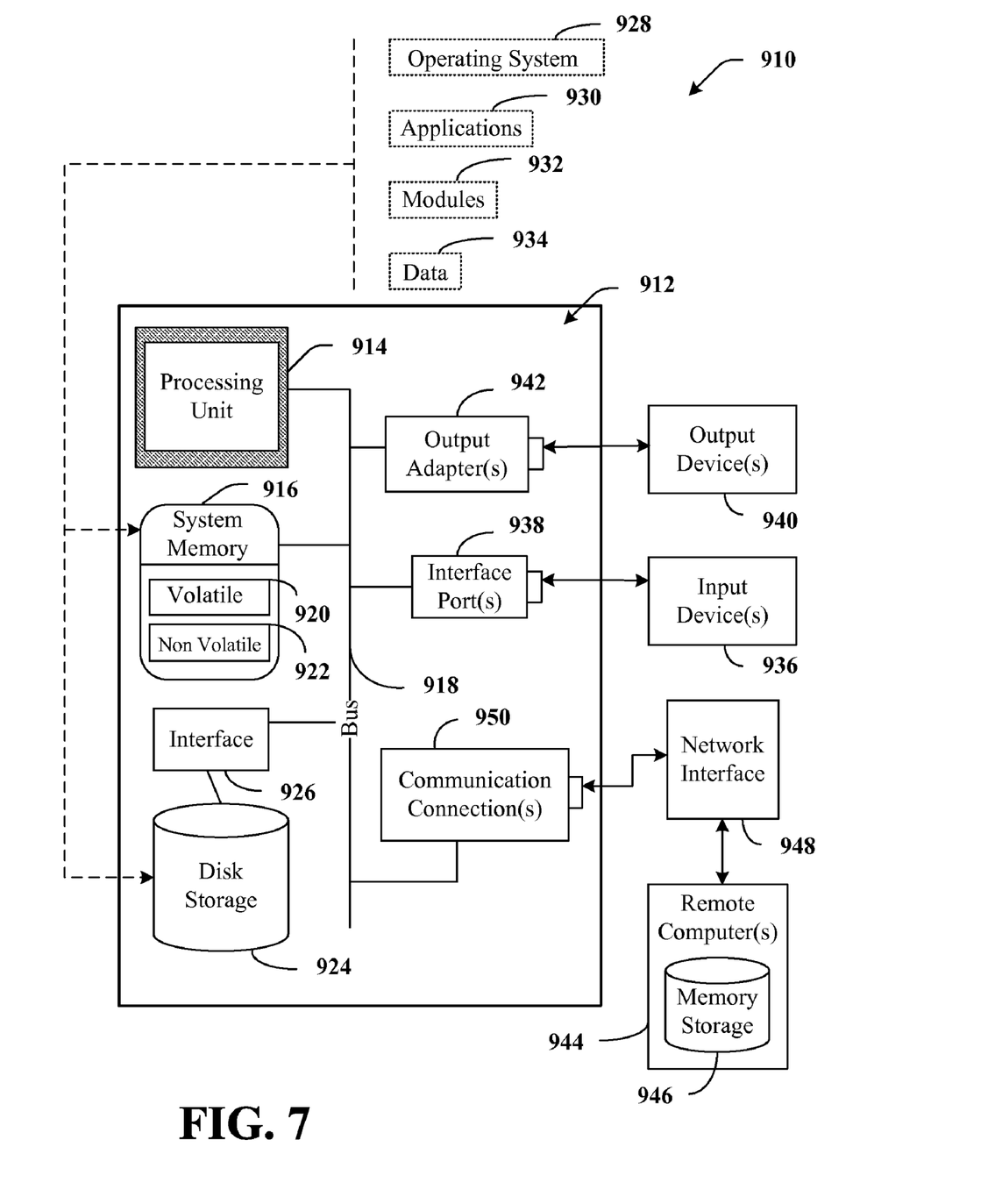
FIG. 7 depicts a schematic block diagram illustrating a suitable operating environment in accordance with an aspect of the subject invention.

With reference to FIG. 7, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 7 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 8:
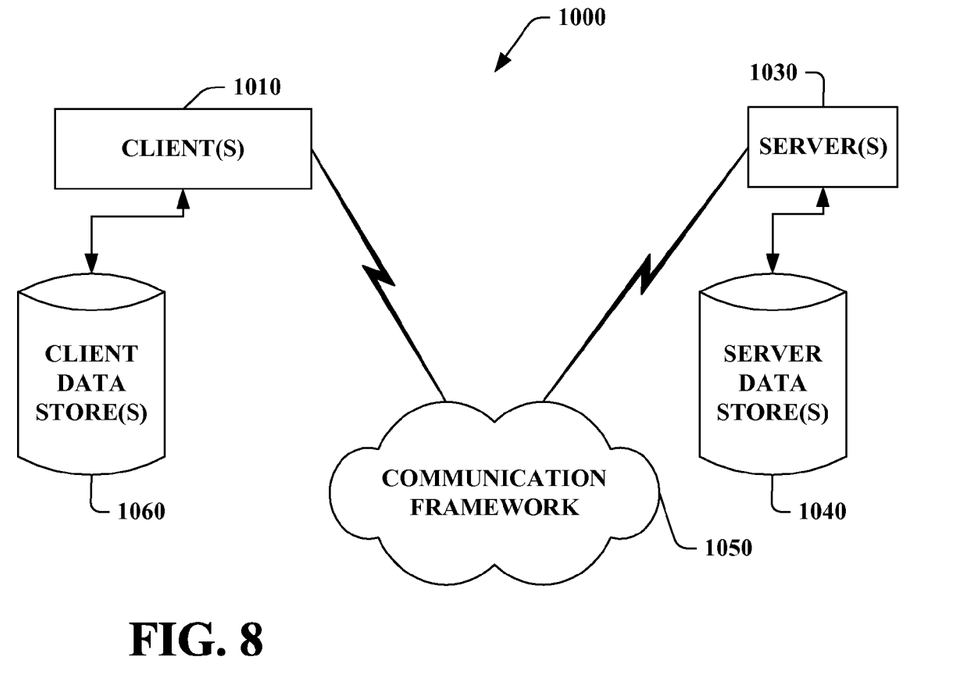
FIG. 8 depicts a schematic block diagram of a sample-computing environment with which the subject invention can interact.

FIG. 8 is a schematic block diagram of a sample computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A portable wireless device for performing a short duration digital data exchange with a second wireless device, comprising:
    a first wireless communication channel for performing a data exchange session;
    a second wireless communication channel of longer range than the first wireless communication channel; and
    a wireless controller configured to sense a control signal on the second wireless communication channel and to negotiate parameters for a future data exchange session including a data request, aspects of the future data exchange based on a predicted session duration, the predicted session duration based in part on topology data representing terrain in an area of the wireless controller, and based in part on generic coverage footprints for classes of network devices with which the wireless controller may be communicating, the negotiated parameters prompting pre-fetching of content for transmission on the first wireless communication channel, the pre-fetching performed prior to the wireless controller sensing a data signal on the first wireless communication channel, the wireless controller further configured to sense the data signal on the first wireless communication channel, and in response, to establish the data exchange session and perform the data exchange of the data request, the data exchange session increasing error and noise tolerance for portions of the data exchange session expected to be at an edge of reception, the wireless controller further configured to tag information about interference emitters detected during the data exchange session with date and time data and to save the tagged information for later use.

2. The portable wireless device of claim 1, further comprising a session prediction module containing diversity parameters for a wireless network, the wireless controller accessing the diversity parameters to optimize the first wireless communication channel.

3. The portable wireless device of claim 2, further comprising a location engine for determining a present location and vector to predict proximity to the wireless network.

4. The portable wireless device of claim 3, wherein the location engine comprises a global positioning system module.

5. The portable wireless device of claim 3, further comprising a roadmap database to predict a route of travel.

6. The portable wireless device of claim 3, further comprising a digital terrain map to predict proximity as a function of effective range.

7. The portable wireless device of claim 1, wherein a selected one of the first and second wireless communication channels comprises a radio modality selected from a group consisting of an IEEE 802.11 digital communication channel, an IEEE 802.16 WiMAX digital communication channel, a Bluetooth personal access network channel, a digital cellular telephony systems, and ultra-wideband (UWB).

8. The portable wireless device of claim 1, wherein a host network is in communication with a first infrastructure wireless device, a second infrastructure wireless device along a route of travel of the portable wireless device, and a source of content associated with the data request, the wireless controller of the portable wireless device requesting a data session along a course of travel from second infrastructure device of the host network and receiving parameters for the future data exchange session with the first infrastructure wireless device.

9. The portable wireless device of claim 1, further comprising an antenna diversity selector for increasing data exchanged during the data exchange session.

10. The portable wireless device of claim 1, further comprising a cognitive radio scanner, the wireless controller further responsive to negotiating parameters for a sensed available channel to the second wireless communication channel.

11. The portable wireless device of claim 1, further comprising a coding module having a plurality of communication parameters selectable to predictively extend an effective reception range of the portable wireless device.

12. The portable wireless device of claim 11, wherein the coding module comprises a forward error coding module and a modulation coding module.

13. The portable wireless device of claim 11, further comprising a directional antenna having antenna gain oriented toward a direction of travel of the portable wireless device.

14. The portable wireless device of claim 1, further comprising a rule-based component for optimizing the data exchange session.

15. The portable wireless device of claim 1, further comprising an artificial intelligence component for optimizing the data exchange session.

16. A method for short duration digital data exchange with a wireless device, comprising:
    projecting first and second forward shaped coverage beams of a wireless control channel from first and second moving vehicles, respectively;
    projecting first and second beams of a wireless data channel from the first and second moving vehicles, respectively, the first and second forward shaped coverage beams of the wireless control channel having greater range than the first and second beams of the wireless data channel;
    predicting a duration of a wideband data exchange session, the predicted duration based in part on topology data of terrain in an area of the first and second moving vehicles, and based in part on generic coverage footprints for classes of network devices usable within the first and second moving vehicles;
    negotiating parameters using the wireless control channel for the wideband data exchange session in the future on the wireless data channel, the negotiated parameters prompting pre-fetching of content for transmission on the wireless data channel, the pre-fetching performed prior to the wideband data exchange session;
    requesting data to be exchanged during the data exchange session;
    establishing and performing the data exchange session in response to the first and second moving vehicles coming within reception range suitable for wideband data exchange, the data exchange session exchanging traffic and weather information, and the data exchange session increasing error and noise tolerance for portions of the data exchange session expected to be at an edge of reception;
    tagging information about interference emitters with date and time data, the interference emitters detected during the wideband data exchange session; and
    saving the tagged information for later use.

17. The method of claim 16, further comprising:
    predicting a route of travel;

determining a network device for wideband data exchange that will be within range at a future time based upon the route of travel; and negotiating parameters via the wireless control channel for use of a wireless data channel with the network device in advance of being within range of the wireless data channel.

18. The method of claim 16, further comprising performing diversity optimizing of the data exchange session based upon historical data associated with a network device.

19. The method of claim 16, further comprising performing diversity optimizing of the data exchange session based upon parameters provided over the wireless control channel.

20. A computer-implemented wireless device system for short duration digital data exchange with another wireless device system, comprising:

means for projecting first and second forward shaped coverage beams of a wireless control channel from first and second moving vehicles, respectively;

means for projecting first and second beams of a wireless data channel from the first and second moving vehicles, respectively, the first and second forward shaped coverage beams of the wireless control channel having greater range than the first and second beams of the wireless data channel;

means for negotiating parameters using the wireless control channel for a wideband data exchange session in the future on the wireless data channel, the negotiated parameters prompting pre-fetching of content for transmission on the wireless data channel, the pre-fetching performed prior to the wideband data exchange session;

means for mitigating interference by detecting an interference signal, matching a pattern of the interference signal to data previously stored indicating characteristics of an interference source previously encountered, recognizing the interference source as originator of the interference signal, and adapting the data exchange session according to characteristics of the recognized interference source, the characteristics including at least a location of the recognized interference source;

means for requesting data to be exchanged during the data exchange session; and means for establishing and performing the data exchange session in response to coming within reception range suitable for wideband digital data exchange, the data exchange session being performed in a burst manner that transmits the content pre-fetched for transmission on the wireless data channel and that increases error and noise tolerance for portions of the data exchange session expected to be at an edge of reception.

\* \* \* \* \*

UNITED STATES PATENT AND TRADEMARK OFFICE
CERTIFICATE OF CORRECTION

PATENT NO.         : 8,184,656 B2
APPLICATION NO.    : 11/866092
DATED              : May 22, 2012
INVENTOR(S)        : Chandra et al.

Page 1 of 1

It is certified that error appears in the above-identified patent and that said Letters Patent is hereby corrected as shown below:

In The Specification

In column 4, line 48, delete "S.sub.0"" and insert -- "$S_0$" --, therefor.

In column 11, line 42, delete "removeable," and insert -- removable, --, therefor.

In The Claims

In column 19, line 2, In Claim 17, delete "a future" and insert -- the later --, therefor.

Signed and Sealed this
Fifth Day of May, 2015

Michelle K. Lee
*Director of the United States Patent and Trademark Office*